Patented May 14, 1935

2,001,658

UNITED STATES PATENT OFFICE 2,001,658

DRYING PARA-HYDROXYDIPHENYL

William H. Williams, Midland, Mich., assignor to The Dow Chemical Company, Midland, Mich., a corporation of Michigan No Drawing. Application July 12, 1934, Serial No. 734,822

2 Claims. (Cl. 260—154)

This invention relates particularly to methods for dehydrating para-hydroxydiphenyl.

Para-hydroxydiphenyl may be obtained in a variety of ways, for instance, by the catalytic dehydrogenation of para-cyclohexyl-phenol, or, as a by-product from the manufacture of phenol by the hydrolysis of mono-chlorobenzene with aqueous caustic alkali solution under pressure at a temperature between 300° and 400° C. In any event, it is recovered from the reaction mixture by dissolving in an aqueous alkali solution and then precipitating therefrom in crystalline form by acidification. The crystals are filtered from the aqueous solution and are obtained as a wet filter cake. The problem is thus created of how best to dehydrate the wet filter cake, which may contain as much as 60 per cent of water.

Drying the wet cake by direct heating thereof as in a tray drier under reduced pressure, in quantity production of the compound, is of course out of the question because of the long time that would have to be taken to dry a large quantity of the material and the extensive handling required. Treatment of the wet cake with a hot air stream in a continuous rotary drier is distinctly disadvantageous because the air carries out a certain burden of material, difficultly and uneconomically recoverable therefrom. This loss may be as high as 10 per cent. In addition, some oxidation of the compound results through contact with the hot air, thereby affecting the purity and color of the finished product.

It is accordingly a particular object of my invention to provide a method for dehydrating para-hydroxydiphenyl whereby contact of the compound with heated air or other gas during the dehydration is avoided; and, a method of drying the compound wherein its low heat conductivity does not limit the rapidity of drying.

In order to avoid the aforementioned difficulties and provide a method which minimizes the handling of the material and the exposure of the material to air during drying, I have developed a novel procedure which consists essentially in feeding the wet material, e. g. usually as filter cake, into a body of molten substantially anhydrous para-hydroxydiphenyl. The water in the wet material is thus quickly vaporized and the para-hydroxydiphenyl itself becomes incorporated in the body of molten material. Thus, I have fed approximately 1000 pounds per hour of filter cake consisting of 40 per cent of para-hydroxydiphenyl and 60 per cent of water at a substantially uniform rate into a molten mass of para-hydroxydiphenyl maintained at a temperature between about 165° and about 170° C. The molten mass is preferably to be continuously agitated during the addition of the wet filter cake. Anhydrous para-hydroxy-diphenyl is continuously or periodically withdrawn from the molten body to a vacuum still from which it is obtained as condensate.

The steam flashed off from the wet filter cake passes to a jet condenser and is condensed therein by contact with a cool saturated aqueous solution of para-hydroxydiphenyl. Any small amounts of the para-hydroxydiphenyl carried by the steam can then be recovered by settling and filtration. The condensing solution is partially evaporated, as in a spray pond, to cool and concentrate it before it is returned to the condenser. By recirculating an aqueous solution of para-hydroxydiphenyl with concentration and cooling, any loss of small amounts of para-hydroxydiphenyl carried over to the condenser in the steam from the drier is thus avoided.

My method for drying para-hydroxydiphenyl provides an improved procedure wherein the material is not exposed to oxidation, a minimum of handling is required, relatively inexpensive equipment is used as contrasted with tray or rotary apparatus, and loss of the material during drying is avoided.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method for the dehydration of para-hydroxydiphenyl, the step which consists in feeding said compound to a substantially anhydrous mass thereof maintained in the molten condition.

2. In a method for the dehydration of para-hydroxydiphenyl, the step which consists in feeding said compound into a substantially anhydrous molten mass thereof maintained at a temperature between about 165° and about 170° C. at atmospheric pressure.

WILLIAM H. WILLIAMS.